United States Patent
Kallio et al.

(10) Patent No.: US 6,720,394 B1
(45) Date of Patent: *Apr. 13, 2004

(54) SUPPORTED OLEFIN POLYMERIZATION CATALYST COMPOSITION

(75) Inventors: Kalle Kallio, Vanhakylä (FI); Marja Mustonen, Porvoo (FI); Hilkka Knuuttila, Porvoo (FI)

(73) Assignee: Borealis Technology Oy, Porvoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/700,996

(22) PCT Filed: May 24, 1999

(86) PCT No.: PCT/FI99/00442

§ 371 (c)(1),
(2), (4) Date: Jan. 22, 2001

(87) PCT Pub. No.: WO99/61489

PCT Pub. Date: Dec. 2, 1999

(30) Foreign Application Priority Data

May 25, 1998 (FI) .................................................. 981148

(51) Int. Cl.[7] ............................. C08F 4/642; C08F 4/646
(52) U.S. Cl. ..................... 526/127; 526/124.3; 526/129; 526/153; 526/160; 526/161; 526/172; 526/943; 502/104; 502/107; 502/117; 502/132; 502/152; 502/155
(58) Field of Search .................... 502/104, 107, 502/117, 132, 152, 155; 526/124.3, 127, 129, 153, 160, 161, 172, 943

(56) References Cited

U.S. PATENT DOCUMENTS 6,380,332 B1 * 4/2002 Kallio et al. ................ 526/128

FOREIGN PATENT DOCUMENTS

| EP | 0598543 | 5/1994 |
|----|---------|--------|
| EP | 0737694 | 10/1996 |
| FI | 970349 | 7/1998 |
| WO | WO 95 11263 | 4/1994 |
| WO | WO 97 28170 | 8/1997 |
| WO | WO 98 32775 | 7/1998 |

* cited by examiner

Primary Examiner—Roberto Rabago
(74) Attorney, Agent, or Firm—Birch, Stewart, Kolasch & Birch, LLP

(57) ABSTRACT

Alumoxanes having C2–C12 alkyl groups can conveniently be used in supported olefin polymerization catalyst compositions prepared by contacting, either previous to or immediately before the beginning of the olefin polymerization, a support comprising a porous carrier with (a) an organometallic compound of the general formula $R_1MX_{y-1}$, (b) a metallocene of the general formula $(CpY)_m M'X'_n Z_o$ and an alumoxane of the following general formula

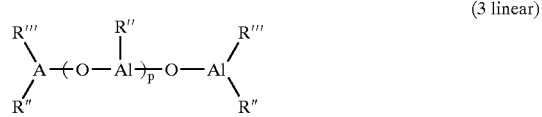
(3 linear)

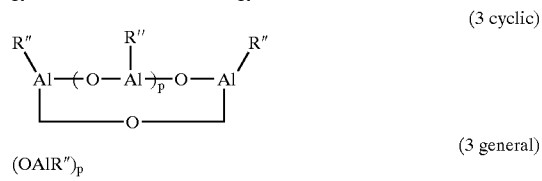

(3 cyclic)

$(OAlR'')_p$
(3 general)

in any order.

38 Claims, No Drawings

SUPPORTED OLEFIN POLYMERIZATION CATALYST COMPOSITION

This application is the national phase under 35 U.S.C. §371 of PCT International Application No. PCT/FI99/00442 which has an International filing date of May 24, 1999, which designated the United States of America.

The present invention relates to a process for the preparation of a supported olefin polymerization catalyst composition, comprising a support optionally treated with an organometallic compound, a metallocene, and an alumoxane. The invention also relates to a supported olefin polymerization catalyst composition which has been prepared according to said process and to the use of such a supported olefin polymerization catalyst composition for the polymerization of at least one olefin.

In many olefin polymerization processes using a single site catalyst, it is desirable to support the catalyst on a carrier or support. Usually such supported catalyst compositions include a metallocene and an alumoxane supported on an inorganic oxide carrier such as silica and/or alumina.

For example, WO 96/00243 describes a method for producing a supported catalyst composition by mixing a bridged bis-indenyl metallocene and an alumoxane in a solvent to form a solution, and then combining the solution and a porous support, whereby the total volume of the solution is less than that at which a slurry is formed. A typical support used was previously heated silica MS 948 (Grace) and a typical alumoxane used was gel-free methyl alumoxane (MAO), both of which were used in all of the examples.

According to S. Srinvasa Reddy, Polymer Bulletin, 36 (1996) 317–323, the ethylene polymerization activity of tetraisobutyldialumoxane cocatalyst was clearly lower than the activity of methylalumoxane cocatalyst. This reflects the previous general opinion, that only methyl alumoxane as a cocatalyst gave satisfactory ethylene polymerization catalyst activities.

In the present application a catalyst system has been described where the catalyst composition comprises a support optionally treated with an organometallic compound, a metallocene, and an alumoxane. Now it has been realized that when an aluminium oxide support and a metallocene with at least one silyl substituent in the cyclopentadienyl ring are used in polymerization with an alumoxane as an external cocatalyst, the polymer morphology does not meet the requirements when using the known polymerization methods. When alumoxane with large molecular size, like hexaisobutylalumoxane, is used as an external cocatalyst, it has difficulties to diffuse evenly into a very porous catalyst particle, which causes the polymerization to start from the surface of the catalyst particle where the alumoxane is capable to activate the metallocene. Because polymerization starts only at the surface of the catalyst particle, an uncontrolled break down of the catalyst takes place and causes high risk for reactor fouling and inhomogenous polymer. Also when a high molecular weight alumoxane is used as an external coactivator in a gas phase process, there is a tendency of the solvent of the alumoxane to evaporate forming a solid alumoxane. When the coactivator becomes solid, it has no possibilities to enter into the metallocene catalyst pores and it is not anymore able to activate metallocene compounds.

The purpose of the present invention is to improve the quality of the product when metallocenes with at least one silyl substituent in the cyclopentadienyl ring are used with a non-methyl alumoxane in olefin polymerization. More specifically, the present invention aims at providing an olefin polymerization catalyst composition including a metallocene with at least one silyl substituent in the cyclopentadienyl ring and a $C_2$–$C_{12}$ alkyl alumoxane, which has commercially satisfactory activity when producing olefin homopolymers and copolymers. A further goal of the present invention is a supported olefin polymerization catalyst composition for use in gas phase, slurry phase or liquid/solution phase polymerizations.

The above mentioned purposes of the invention have now been realized by a novel process for the preparation of a supported olefin polymerization catalyst composition, comprising a porous carrier optionally treated with an organometallic compound, a metallocene, and an alumoxane. If an alkylated metallocene is used, the carrier need not to be treated with an organometallic compound. The porous carrier is preferably an inorganic oxide, most preferably a silicon dioxide. The claimed process comprises mainly impregnating a support comprising a solid compound being a porous carrier, previous to or immediately before the beginning of the olefin polymerization, in any order, optionally with a) an organometallic compound of the general formula (1):

$$R_1MX_{v-1} \qquad (1)$$

wherein each R is the same or different and is a $C_1$–$C_{10}$ alkyl group; M is a metal of Group 1, 2, 12 or 13 of the Periodic Table (IUPAC 1990); each X is the same or different and one of a halogen atom, a hydrogen atom, a hydroxyl radical or a $C_1$–$C_8$ hydrocarbyloxy group; 1 is 1, 2 or 3; v is the oxidation number of the metal M, and with a complex solution of at least b) a metallocene of the general formula (2):

$$(CpY)_mM'X'_nZ_o \qquad (2)$$

wherein each CpY is the same or different and is one of a mono- or polysubstituted, fused or non-fused, homo- or heterocyclic cyclopentadienyl, indenyl, tetrahydroindenyl, fluorenyl, or octahydrofluorenyl ligand, the ligand being covalently substituted at its cyclopentadienyl ring with at least one substituent Y which is one of a —OR', —SR', —NR'$_2$, —CR'=, or —PR'$_2$ radical, each R' being the same or different and being one of a tri-$C_1$–$C_8$ hydrocarbyl silyl group or a tri-$C_1$–$C_8$ hydrocarbyloxy silyl group; M' is a transition metal of Group 4 of the Periodic Table and bound to the ligand CpY at least in an $\eta_5$ bonding mode; each X' is the same or different and is one of a hydrogen atom, a halogen atom, a $C_1$–$C_8$ hydrocarbyl group, a $C_1$–$C_8$ hydrocarbylheteroatom group or a tri-$C_1$–$C_8$ hydrocarbylsilyl group or two X' form a ring with each other; Z is a bridge atom or group between two CpY ligands or one CpY ligand and the transition metal M'; m is 1 or 2; o is 0 or 1; and n is 4-m if there is no bridge Z or Z is a bridge between two CpY ligands or n is 4-m-o if Z is a bridge between one CpY ligand and the transition metal M', and c) an alumoxane of the following general formulas (3):

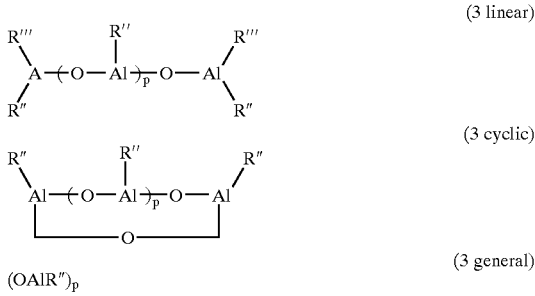

(3 linear)

(3 cyclic)

(OAlR″)$_p$ (3 general)

wherein each R″ and each R‴ is the same or different and is a $C_2$–$C_{12}$ alkyl group; and p is an integer between 1 and 40, and recovering said supported olefin polymerization catalyst composition.

At step (a) the support can be treated for example with an aluminiumalkyl to alkylate the support. However, when an alkylated metallocene compound is used, the alkylation of the support is not needed. When an alkylated metallocene is used it is advantageous to treat the support by heat for removing some hydroxyl groups from the surface of the carrier particle.

By mono- or polysubstituted is meant that, in addition to said substituent Y, there may optionally be other substituents at the rings at said ligands CpY.

By fused or non-fused is meant that any ring at said ligands may be fused or non-fused, i.e. have at least two atoms in common, with at least one further ring.

By homo- and heterocyclic is meant that any ring of said ligands may have only carbon ring atoms (homo- or isocyclic) or may have other ring atoms than carbon (heterocyclic).

It has thus been realized that a $C_2$–$C_{12}$ alkyl alumoxane (i.e. a non-methyl alumoxane) can successfully be used as an internal coactivator, if a support comprising a porous carrier is treated with a solution of metallocene having at least one silyl substituent at the cyclopentadienyl ring and with a non-methylalumoxane based alumoxane. It is advantageous first to treat the porous carrier particle with an organometallic compound to alkylate the surface of the particle. However, this is not needed if a alkylated metallocene is used.

According to a non-limiting model, said electron pair of double bond substituents at the cyclopentadienyl ring delocalize it's negative charge and help to ionize the metallocene, whereby the transition metal M becomes more cationic (electron density deficient). This improves the catalytic interaction between the metallocene and the alumoxane and enables the use of higher alumoxanes like those of the above formula (3).

Generally, said support can be contacted with compounds b) and c), and optionally a), in any order. Thus, the support can e.g. be impregnated with a solution of the three compounds a), b) and c), preferably first with compound a) and then with a solution containing compound b) and compound c).

According to one embodiment of the invention, the contacting of the support with compounds a), b) and c) takes place by firstly contacting the support with a solution of said organometallic compound (1) and thereafter with a solution containing said metallocene (2) and said alumoxane (3). In one preferable embodiment of the invention, the contacting takes place by a$_1$) contacting said support with a solution of said organometallic compound (1), and removing the supernatant from the contacting product, b$_1$) contacting the product of step a$_1$) with a a complex solution of said metallocene of formula (2) and of said alumoxane of formula (3), and removing the supernatant from the contacting product.

When contacting said support with compounds a, b and c in liquid form such as the form of a solution, a slurry or a non-slurry contacting product can be formed. However, it is preferable to impregnate the support with a liquid, the volume of which is less than at which a slurry is formed. This means that the volume of said liquid is less than or approximately equal to the volume of the support pores.

The support used in the process of the present invention is a porous carrier, preferably an inorganic oxide, for example pure silicon dioxide. According to the invention a porous carrier particle gives high-activity olefin polymerization catalysts when combined with a $C_2$–$C_{12}$ alkyl alumoxane according to formula (3) and a metallocene according to formula (2). The material carrying said solid compound can be any inert porous particulate material, including silica. The most preferable support comprises a porous silicon dioxide, which has been heated to a temperature between 90–1000° C. The silicon dioxide, preferably calcined silica, is preferentially in the form of, or deposited on, particles having a diameter of between 10–500 μm, most preferably between 20 and 200 μm. The specific surface area of the silicon dioxide is according to one embodiment of the invention between 50 and 600 m²/g, preferably between 100 and 500 m²/g. The average pore volume is usually between 0.5 and 5.0 ml/g, preferably between 1.0 and 2.5 ml/g. The average pore diameter is for example 100–500 Å, preferably approximately 200 Å.

According to one embodiment of the process of the present invention, the support is contacted with an organometallic compound of the general formula (1):

$$R_lMX_{v-1} \qquad (1)$$

wherein each R is the same or different and is a $C_1$–$C_{10}$ alkyl group; M is a metal of Group 1, 2, 12 or 13 of the Periodic Table; each X is the same or different and one of a halogen, a hydrogen atom, a hydroxyl radical or a $C_1$–$C_8$ hydrocarbyloxy group; l is 1, 2 or 3; and v is the oxidation number of the metal M.

According to a non-limiting theoretical model, the organometallic compound deposited on the carrier material alkylates the carrier surface, which in turn alkylates the metal of the metallocene compound. If the metallocene compound is already alkylated, there is no need for alkylation of the carrier. These alkylated siloxy substituted metallocenes are reflected in the successful use of otherwise poorly active higher alumoxanes.

The $C_1$–$C_{10}$ alkyl group R of formula (1) is preferably a $C_1$–$C_6$ alkyl group and most preferably a $C_1$–$C_4$ alkyl group. When defining M by means of the Groups and Periods of the Periodic Table, the new numbering system is used (IUPAC 1990). Preferred metals M are those of Periods 1–4 of the Periodic Table.

If occuring, X of formula (1) is a halogen atom, a hydrogen atom, a hydroxyl radical or a hydrocarbyloxy group. According to one embodiment of the invention, said support is contacted, provided that the metallocene of the general formula (2) is not alkylated, with said organometallic compound of the general formula (1), which is one of a $C_1$–$C_{10}$ alkyl lithium, a $C_1$–$C_{10}$ dialkyl magnesium, or a $C_1$–$C_{10}$ trialkyl aluminium, and most preferably is a $C_1$–$C_6$ trialkyl aluminium such as trimethyl aluminium (TMA). When contacting said support with said organometallic compound, it is preferable if the organometallic compound of the formula (1) is immersed or dissolved in a hydrocarbon medium, most preferably a $C_4$–$C_{10}$ hydrocarbon medium. The weight ratio between the added organometallic compound, calculated as trimethyl aluminium, and the support depends on the surface area, pore volume and diameter, surface hydroxyl number and type. According to one embodiment it is between 0.1 and 10, more preferably between 0.2 and 2 and most preferably between 0.3 and 1.5. After the contacting step the remaining unreacted organometallic compound is preferably removed together with the possible hydrocarbon medium, followed by optional washing steps.

According to the process of the present invention said support is contacted with a metallocene of the general formula (2). It is preferred that the metallocene of the general formula (2) as group R' of said substituent Y has a tri-$C_1$–$C_8$ hydrocarbyl silyl or tri-$C_1$–$C_8$ hydrocarbyloxy silyl group. Especially suitable tri-$C_1$–$C_8$ hydrocarbylsilyl groups are those capable of π interaction with said O, S, N, or P atoms of Y. Most preferred are tri-$C_1$–$C_8$ alkyl silyl groups, wherein at least one of the $C_1$–$C_8$ alkyl is a branched $C_3$–$C_8$ alkyl group such as isopropyl, isobutyl, sec-butyl, tert-butyl, isoamyl, sec-amyl, tert-amyl, isohexyl, sec-hexyl, or tert-hexyl. Cyclic alkyls and aryls are also preferred groups of the silicone atom.

According to one embodiment of the invention there is only one ligand CpY in the metallocene of formula (2), which preferably is bound to the transition metal M' by both said η₅ bond and by a bridge Z preferably containing a heteroatom.

However, said metallocene of the general formula (2) has most preferably two ligands CpY, i.e. m is 2. According to a still more preferred embodiment, the two CpY ligands are bridged with each other by a bivalent atom or group Z having at least one chain atom which is one of a carbon, silicon, oxygen, sulphur, nitrogen, or phosphorus atom. Most preferably, the metallocene of the general formula (2) has m=2, whereby Z is an ethylene or a silylene bridge.

The transition metal M' of group 4 of the Periodic Table in the general formula (2) is Ti, Zr or Hf, more preferably Zr or Hf, and most preferably Zr. The valency or oxidation number of M' is 4.

In the definition of X' above, a heteroatom means

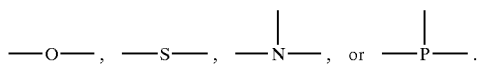

The preferable atom or group X' of said metallocene of formula (2) is a halogen atom and/or a $C_1$–$C_8$ hydrocarbyl group. Most preferably, X' is chlorine and/or methyl. The number of X' atoms or groups, i.e. "n", is preferably 1–3, most preferably 2, considering the limitation given above for the case when Z is a bridge between CpY and M'.

Particularly preferred metallocenes of the general formula (2) are compounds of following structural formula (4).

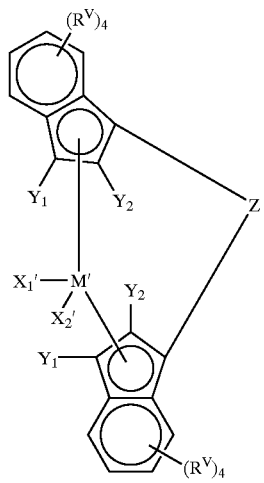

(4)

wherein $Y_1$ and $Y_2$ are the same or different and are one of a hydrogen atom, a halogen atom, an acyl group, an acyloxy group, a $C_1$–$C_{10}$ hydrocarbyl group, a —OR', —SR', —NR', —C(H or R')=, or —PR'$_2$ radical, R' being a tri-$C_1$–$C_8$-hydrocarbylsilyl group, provided that at least one of $Y_1$ and $Y_2$ is one of said —OR', —SR', —NR', —CR'=, or —PR'$_2$ radicals; Z is a bivalent atom or group having at least one chain atom which is one of a carbon, silicon, oxygen, sulphur, nitrogen or phosphorus atom, preferably 1–4 carbon and/or silicon chain atoms; each $R^v$ is the same or different and is one of a hydrogen atom, a halogen atom, a $C_1$–$C_{10}$ hydrocarbyl group or ring constituent, or a $C_1$–$C_{10}$ hydrocarbyloxy group, M' is one of Ti, Zr or Hf; and X'$_1$ and X'$_2$ are the same or different and are one of a halogen atom and a $C_1$–$C_8$ hydrocarbyl group. The analogous 4,5,6,7-tetrahydroindenyl derivatives are also useful in the invention.

A representative metallocene of the formula (2) is ethylene-bis(2-tert-butyldimethylsiloxyindenyl)zirconium dichloride.

When using chiral metallocenes, they can be used as a racemate for the preparation of highly isotactic α-olefin polymers. The pure R or S form of said metallocene can also be used, e.g. for the production of optically active polymer.

The metallocene of the general formula (2) is usually prepared by a process involving repeated deprotonations/metallizations of the aromatic ligands and introduction of the bridge Z atom or atoms as well as the central atom by their halogen derivatives. The preparation of the said metallocene of the general formula (2) can e.g. be carried out according to a J. Organometallic Chem. 288 (1958) 63–67 and EP-A-320762, both herewith incorporated by reference. See also Soares, J. B. P., Hamidec, A. E., Polym. Reaction Eng., 3 (2) (1995) 131–200, herewith incorporated by reference.

The most preferred metallocenes of the general formula (2), wherein Y is a tri-$C_1$–$C_8$ hydrocarbylsiloxy group, is preferably prepared as follows:

The catalyst compounds according to the invention can be prepared from 2-indanone. This compound can be reacted in a suitable solvent with a base and a chlorosilane to form 2-siloxyindene with a yield of over 80%. Suitable solvents are for example dimethylformamide (DMF) and tetrahydrofurane (THF). Suitable bases are for example imidazole and triethylamine (TEA). Suitable chlorosilanes are for example tert-butyldimethylchlorosilane, t-hexyldimethylchlorosilane and cyclohexyldimethylchlorosilane. The reaction takes place according to the following reaction scheme (II):

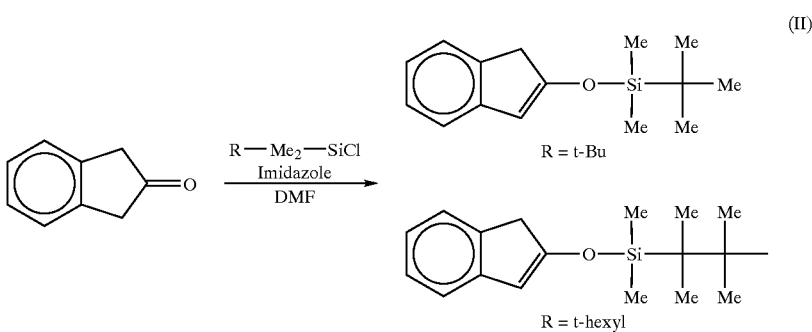

(II)

According to one embodiment of the invention 2-tert-butyldimethylsiloxyindene is reacted first with butyllithium and then with dimethyl dichlorosilane ($Me_2SiCl_2$) to form dimethylsilylbis(2-tert-butyldimethylsiloxyindene). Butyllithium can be replaced with methyllithium, sodium hydride or potassium hydride. Likewise dimethyl dichlorosilane can be replaced with any dialkyl or diarylsilane. Silicon can be replaced with germanium.

Dimethylsilylbis(2-tert-butyldimethylsiloxyindene) can be reacted with butyllithium, which gives the corresponding bislithium salt. This product can be reacted with zirconium tetrachloride to yield dimethylsilylbis(2-tert-butyldimethylsiloxyindenyl)zirconium dichloride as a mixture of the racemic and meso diastereomers. Butyllithium may be replaced as described earlier. Zirconium tetrachloride can be replaced with titanium tetrachloride or hafnium tetrachloride to give the corresponding titanium and hafnium complexes. The reactions take place according to the following reaction schemes (III–IV):

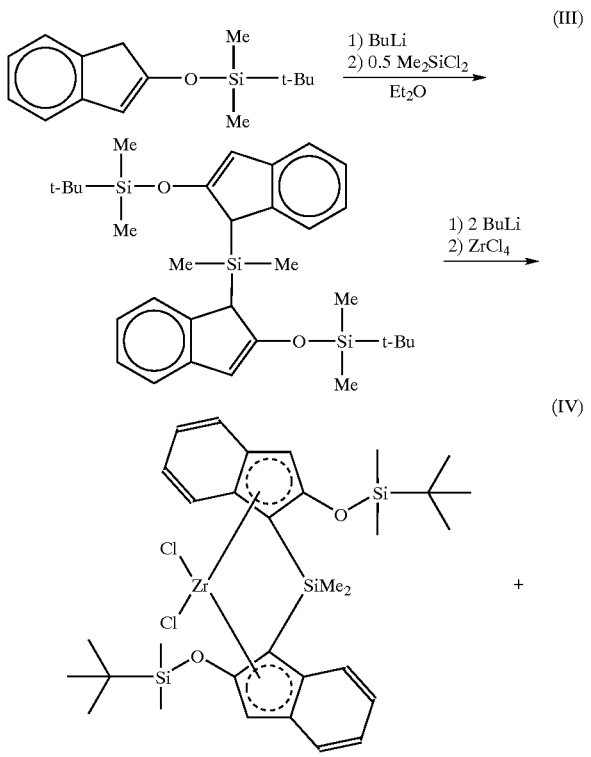

(III)

(IV)

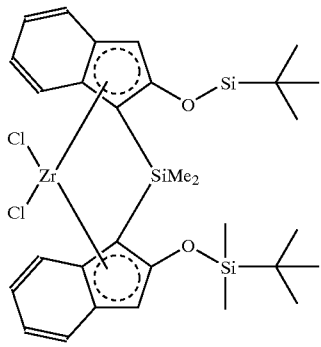

-continued

According to another embodiment of the invention 2-tert-butyldimethylsiloxyindene is reacted first with butyllithium and then with dibromoethane to form bis(2-tert-butyldimethylsiloxyindenyl)ethane. This compound can be reacted with two equivalents of butyllithium, which gives the corresponding bislithium salt. This can then be reacted with zirconium tetrachloride to yield ethylenebis(2-tert-butyldimethylsiloxyindenyl)zirconium dichloride. The racemic diastereomer of the latter is formed in great excess and is easily separated from the meso isomer by fractional crystallization. Catalytic hydrogenation of racemic ethylenebis(2-tert-butyldimethylsiloxyindenyl)zirconium dichloride yields the corresponding tetrahydroindenyl complex. The reactions takes place according to the following reaction scheme (V):

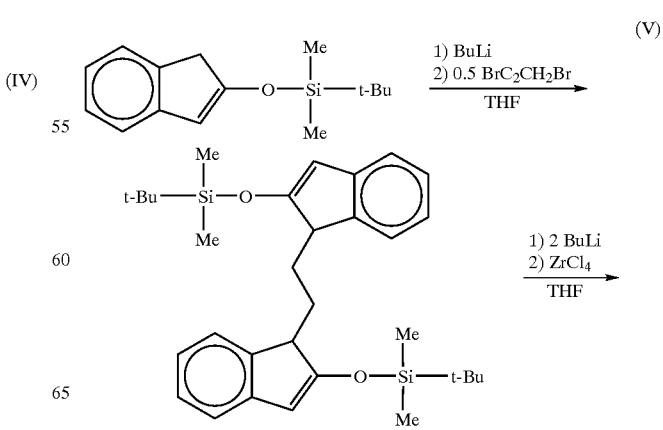

(V)

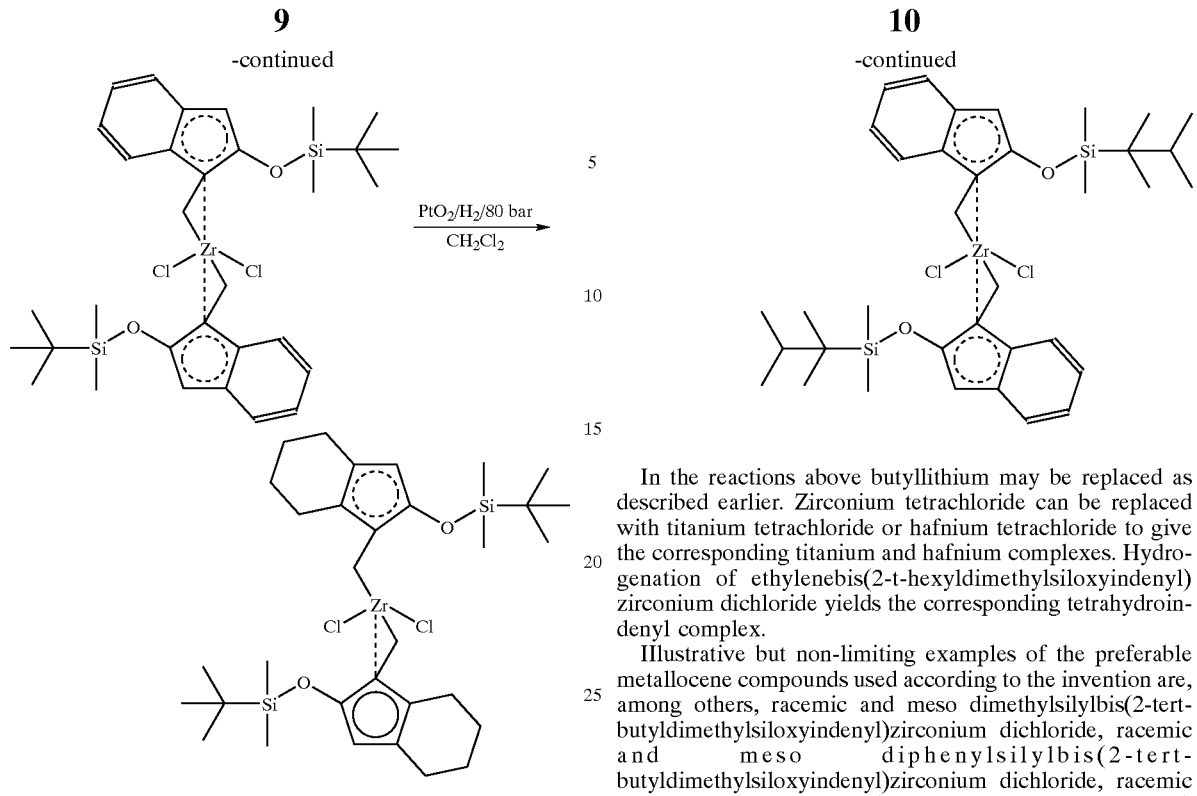

In the reactions above butyllithium may be replaced as described earlier. Zirconium tetrachloride can be replaced with titanium tetrachloride or hafnium tetrachloride to give the corresponding titanium and hafnium complexes.

According to still another embodiment of the invention 2-t-hexyldimethylsiloxyindene is reacted first with butyllithium and then with dibromoethane to form bis(2-t-hexyldimethylsiloxyindenyl)ethane. This compound can be reacted with two equivalents of butyllithium which gives the corresponding bislithium salt. This can then be reacted with zirconium tetrachloride to yield ethylenebis(2-t-hexyldimethylsiloxyindenyl)zirconium dichloride. The racemic diastereomer of the latter is formed in great excess and is easily separated from the meso isomer by fractional crystallization. The reaction takes place according to the following reaction scheme (VI):

In the reactions above butyllithium may be replaced as described earlier. Zirconium tetrachloride can be replaced with titanium tetrachloride or hafnium tetrachloride to give the corresponding titanium and hafnium complexes. Hydrogenation of ethylenebis(2-t-hexyldimethylsiloxyindenyl)zirconium dichloride yields the corresponding tetrahydroindenyl complex.

Illustrative but non-limiting examples of the preferable metallocene compounds used according to the invention are, among others, racemic and meso dimethylsilylbis(2-tert-butyldimethylsiloxyindenyl)zirconium dichloride, racemic and meso diphenylsilylbis(2-tert-butyldimethylsiloxyindenyl)zirconium dichloride, racemic and meso dimethylsilylbis(2-t-hexyldimethylsiloxyindenyl)zirconium dichloride, racemic and meso diphenylsilylbis(2-t-hexyldimethylsiloxyindenyl)zirconium dichloride, racemic and meso dimethylsilylbis(2-cyclohexyldimethylsiloxyindenyl)zirconium dichloride, racemic and meso dimethylsilylbis(2-cyclohexyldimethylsiloxyindenyl)zirconium dichloride, racemic and meso dimethylsilylbis(2-2-tert-butyldiphenylsiloxyindenyl)zirconium dichloride, racemic and meso diphenylsilylbis(2-tert-butyldiphenylsiloxyindenyl)zirconium dichloride, racemic and meso dimethylsilylbis(2-tert-butyldimethylsiloxy-4,5,6,7-tetrahydroindenyl)zirconium dichloride, racemic and meso diphenylsilylbis(2-tert-butyldimethylsiloxy-4,5,6,7-tetrahydroindenyl)zirconium dichloride, racemic and meso dimethylsilylbis(2-t-hexyldimethylsiloxy-4,5,6,7-tetrahydroindenyl)zirconium dichloride, racemic and meso diphenylsilylbis(2-t-hexyldimethylsiloxy-4,5,6,7-tetrahydroindenyl)zirconium dichloride, racemic and meso dimethylsilylbis(2-cyclohexyldimethylsiloxy-4,5,6,7-tetrahydroindenyl)zirconium dichloride, racemic and meso diphenylsilylbis(2-cyclohexyldimethylsiloxy-4,5,6,7-tetrahydroindenyl)zirconium dichloride, racemic and meso dimethylsilylbis(2-tert-butyldiphenylsiloxy-4,5,6,7-tetrahydroindenyl)zirconium dichloride, racemic and meso diphenylsilylbis(2-tert-butylphenylsiloxy-4,5,6,7-tetrahydroindenyl)zirconium dichloride, rac-ethylenebis(2-tert-butylmethylsiloxyindenyl)zirconium dichloride, racemic and meso ethylenebis(2-t-hexyldimethylsiloxyindenyl)zirconium dichloride, racemic and meso ethylenebis(2-cyclohexyldimethylsiloxyindenyl)zirconium dichloride, racemic and meso ethylenebis(2-tert-butyldiphenylsiloxyindenyl)zirconium dichloride, rac-ethylenebis(2-tert-butyldimethylsiloxy-4,5,6,7-tetrahydroindenyl)zirconium dichloride, racemic and meso ethylenebis(2-cyclohexyldimethylsiloxy-4,5,6,7-tetrahydroindenyl)zirconium dichloride, racemic and meso ethylenebis(2-tert-butyldiphenylsiloxy-4,5,6,7-tetrahydroindenyl)zirconium dichloride and rac-ethylenebis (2-t-hexyldimethylsiloxyindenyl)zirconium dichloride. Titanium or hafnium can be used instead of zirconium in corresponding complexes.

When contacting said support, comprising a solid compound being a silicon dioxide, with said metallocene of the general formula (2), the metallocene is preferably dissolved in a $C_4$–$C_{10}$ hydrocarbon solvent and most preferably in an aromatic hydrocarbon solvent such as toluene. As was said before, the metallocene hydrocarbons solution may also contain an alumoxane. The solution is then contacted with the support, which generally is porous.

It is also advantageous, if the total volume of the solution added to the support is less than the volume required to form a support slurry and, according to one embodiment, equal to or less than the pore volume of the support.

Although the amount of metallocene may vary much e.g. due to the structure of the support, according to one embodiment of the present invention, the support is contacted with said metallocene of the formula (2) at a molar to weight ratio between the metallocene and the support of between 0.001 to 0.50 mmol/g, more preferably 0.010 to 0.10 mmol/g, most preferably 0.02 to 0.08 mmol/g.

In the present process for the preparation of a supported olefin polymerization catalyst composition, the support comprising a solid compound being a porous carrier, such as pure silicon dioxide, is contacted with an alumoxane of the general formulas (3). Formulas (3) are general formulas including not only linear and cyclic compounds, but also alumoxane compounds of cage and net structures. See e.g. Harlan, et. al., J. Am Chem. Soc., 117, (1995) p. 6466, the alumoxane structures of which are enclosed by reference to disclose one embodiment of the invention. The alumoxane used in the process of the present invention is preferably an alumoxane (3), wherein said R", and optionally said R'" is a $C_2$–$C_{12}$ alkyl group, more preferably an isopropyl isobutyl, sec-butyl, tert-butyl, isoamyl, sec-amyl, tert-amyl isohexyl, sec-hexyl or tert-hexyl group. The most preferred alumoxane of the formula (3) is preferably an alumoxane in which $2 \leq p \leq 12$, most preferably $4 \leq p \leq 8$. A suitable alumoxane of the formula (3) is hexa(isobutylaluminiumoxane). The alumoxane according to the present invention can be prepared analogously to or by modifying a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, EP-A-0 561 476, EP-B1-0 279 586, EP-A-0 594 218 and WO 94/10180.

According to the invention the alumoxane is acting as an internal coactivator in the catalyst system. In order to introduce sufficient amount of alumoxane into the carrier pores it is preferable to use rather concentrated alumoxane solutions. Said support is contacted previous to or immediately before the beginning of the olefin polymerization, with an alumoxane of formula (3) dissolved or immersed in a hydrocarbon solvent, most preferably a $C_4$–$C_{12}$ aliphatic hydrocarbon solvent such as pentane. When contacting said support with said organometallic compound of the formula (1), said metallocene of the formula (2), and said alumoxane of the formula (3), the molar ratio between the alumoxane aluminium metal and the metallocene transition metal M' in the catalyst composition is preferably between 20 and 500, more preferably 30 and 300 and most preferably between 50 and 150.

When preparing a supported olefin polymerization catalyst composition according to the present invention, the contacting product between the support, the optional organometallic compound of the general formula (1), the metallocene of the general formula (2) and the alumoxane of the general formula (3) can be subjected to a prepolymerization with at least one olefin such as propylene and/or ethylene. The prepolymerizate is then recovered as said supported olefin polymerization catalyst composition.

In addition to the above described process for the preparation of a supported olefin polymerization catalyst composition, the present invention also relates to a supported olefin polymerization catalyst composition which has been prepared according to said described process. The invention also relates to a process for polymerizing at least one olefin by polymerizing in the presence of a supported olefin polymerization catalyst prepared according to the above described process. In the polymerization (homopolymerization and copolymerization) olefin monomers, such as ethylene, propylene, 1-butylene, isobutylene, 4-methyl-1-pentene, 3-methyl-1-butene, 4,4-dimethyl-1-pentene, vinylcyclohexene and their comonomers, can be used. Dienes and cyclic olefins can also be homo- or copolymerized. These $\alpha$-olefins and other monomers can be used both in the polymerization and prepolymerization of the claimed supported olefin polymerization catalyst composition.

The polymerization can be a homopolymerization or a copolymerization and it can take place in the gas, slurry or a solution phase. The claimed catalyst composition can also be used in high pressure processes. Said $\alpha$-olefins can be polymerized together with higher $\alpha$-olefins in order to modify the properties of the final product. Such higher olefins are 1-hexene, 1-octene, 1-decene, etc.

In the following, the present invention is illustrated by non-limited examples.

EXAMPLES

Example 1

Catalyst Preparation

Silica Calcination

In the most of the catalysts, the carrier used was Sylopol 55 SJ silica (calcinated at 100° C.).

Trimethylaluminium Treatment of Silica

In these catalysts, silica was treated with TMA (trimethylaluminium, 20% in pentane): 3 ml of the TMA solution was added to 1 g of silica, allowed to react for 2 hours, then 10 ml pentane was added and the compounds were allowed to react further for 30 minutes. Then the excess of pentane was decanted away and this "washing" was repeated 3 times under nitrogen without stirring.

Impregnation of Metallocene and Alumoxane Compound

After the TMA treatment, onto 10 g of said silica 15 ml of complex solution of 70-w-% hexaisobutylalumoxane in pentane and 405 mg of rac-ethylene-bis(2-tert-butyldimethylsiloxyindenyl)zirconium dimethyl was added by using dry mixing method. After 15 min impregnation the catalyst was dried by nitrogen flow. The ready catalyst had 0.6 w-% Zr, and Al/Zr ratio of 120.

Test Polymerization

Polymerization was carried out in a 2-liter Büchi autoclave in i-butane slurry. The ethylene partial pressure was 5 bar and the temperature was 80° C. 131 mg of catalyst was fed into the autoclave, and after 60 min polymerization the yield of polymer was 124 g which gives catalyst activity of 0.95 kg PE/g cat h.

Example 2

Catalyst Preparation

Carrier Calcination
Sylopol 55SJ silica is not calcinated.
Impregnation of Metallocene
200 mg of rac-ethylene-bis(2-tert-butyldimethylsiloxyindenyl)zirconium dimethyl was dissolved into 5 g 90% hexaisobutylalumoxane and 3 ml toluene was added.
7.5 ml of this solution was added to 5 g of the previously prepared silica carries in a reaction flask. The catalyst precursor was dried in a fume cupboard under a nitrogen flow at 30° C. for one hour. The ready catalyst has Zr content of 0.6 w-% and Al/Zr=120.
Test Polymerization
Polymerization was carried out in a 2-liter Büchi autoclave in i-butane. The ethylene partial pressure was 5 bar, the temperature was 80° C. and the reaction time was 1 hour. 180 mg of the catalyst was fed to the autoclave. After 1 hour of polymerization, the yield of polyethylene was 14.9 g, giving a catalyst activity of 0.08 kg PE/(g cat h).
Polymer Properties
Mw/Mn=4.4; Mw=212 000.

Example 3

Catalyst Preparation

Carrier Calcination
Sylopol 55SJ silica was calcinated under nitrogen for 10 hours at 100° C.
Impregnation of Metallocene
405.4 mg of rac-ethylene-bis(2-(tert-butyldimethylsiloxyindenyl)zirconium dimethyl was dissolved into 15 ml 70% hexaisobutylalumoxane and toluene was added. 15 ml of this solution was added to 10.0463 g of the previously prepared silica carries in a septum bottle. The ready catalyst has Zr content of 0.6 w-% and Al/Zr=120.
Test Polymerization
Polymerization was carried out in a 2-liter Büchi autoclave in i-butane. The ethylene partial pressure was 5 bar, the temperature was 80° C. and the reaction time was 1 hour. 130 mg of the catalyst was fed to the autoclave. After 1 hour of polymerization, the yield of polyethylene was 121 g, giving a catalyst activity of 0.96 kg PE/(g cat h).
Polymer Properties
Mw/Mn=3.7; Mw=283 000.

Example 4

Catalyst Preparation

Carrier Calcination
Sylopol 55SJ silica was calcinated under nitrogen for 10 hours at 100° C.
Impregnation of Metallocene
405.4 mg of rac-ethylene-bis(2-tert-butyldimethylsiloxyindenyl)zirconium dimethyl was dissolved into 15 ml 70% hexaisobutylalumoxane and toluene was added. 15 ml of this solution was added to 10.0463 g of the previously prepared silica carries in a septum bottle. The catalyst was dried in a fume cupboard under a nitrogen flow at 30° C. for one hour. The catalyst has Zr content of 0.6 w-% and Al/Zr=120.
Test Polymerization
Polymerization was carried out in a 2-liter Büchi autoclave in i-butane. The ethylene partial pressure was 5 bar, the temperature was 80° C. and the reaction time was 1 hour. 130 mg of the catalyst was fed to the autoclave. After 1 hour of polymerization, the yield of polyethylene was 196 g, giving a catalyst activity of 1.5 kg PE/(g cat h).
Polymer Properties
Mw/Mn=4.7; Mw=372 000.

Example 5

Catalyst Preparation

Carrier Calcination
Sylopol 55SJ silica was calcinated under nitrogen for 10 hours at 300° C.
Impregnation of Metallocene
40 mg of rac-ethylene-bis(2-tert-butyldimethylsiloxyindenyl)zirconium dimethyl was dissolved into 1 ml 90% hexaisobutylalumoxane and 0.5 ml toluene was added. 1.5 ml of this solution was added to 1.0531 g of the previously prepared silica carries in a septum bottle. The catalyst was dried in a fume cupboard under a nitrogen flow at 30° C. for one hour. The catalyst has Zr content of 0.6 w-% and Al/Zr=120.
Test Polymerization
Polymerization was carried out in a 2-liter Büchi autoclave in i-butane. The ethylene partial pressure was 5 bar, the temperature was 80° C. and the reaction time was 1 hour. 136 mg of the catalyst was fed to the autoclave. After 1 hour of polymerization, the yield of polyethylene was 212 g, giving a catalyst activity of 0.9 kg PE/(g cat h).

Example 6

Catalyst Preparation

Carrier Calcination
Sylopol 55SJ silica was calcinated under nitrogen for 10 hours at 600° C.
Impregnation of Metallocene
40 mg of rac-ethylene-bis(2-tert-butyldimethylsiloxyindenyl)zirconium dimethyl was dissolved into 1 ml 90% hexaisobutylalumoxane and 0.5 ml toluene was added. 1.5 ml of this solution was added to 1.3026 g of the previously prepared silica carries in a septum bottle. The catalyst was dried in a fume cupboard under a nitrogen flow at 30° C. for one hour. The catalyst has Zr content of 0.6 w-% and Al/Zr=120.
Test Polymerization
Polymerization was carried out in a 2-liter Büchi autoclave in i-butane. The ethylene partial pressure was 5 bar, the temperature was 80° C. and the reaction time was 1 hour. 140 mg of the catalyst was fed to the autoclave. After 1 hour of polymerization, the yield of polyethylene was 210 g, giving a catalyst activity of 1.3 kg PE/(g cat h).

Example 7

Catalyst Preparation

Carrier Calcination
Sylopol 55SJ silica was calcinated under nitrogen for 10 hours at 100° C.
Impregnation of Metallocene
This work consists on synthesizing metallocene catalysts with the compound 82.6 mg of rac-ethylene-bis(2-tert-butyldimethylsiloxyindenyl)zirconium dimethyl was dissolved into 1.14 g 90% hexaisobutylalumoxane and 0.7 ml toluene was added. 1.5 ml of this solution was added to 1.0457 g of the previously prepared silica carries in a septum bottle. The catalyst was dried in a fume cupboard under a nitrogen flow at 30° C. for one hour. The catalyst has Zr content of 1.2 w-% and Al/Zr=120.

Test Polymerization First (One Day Ageing)

Polymerization was carried out in a 2-liter Büchi autoclave in i-butane. The ethylene partial pressure was 5 bar, the temperature was 80° C. and the reaction time was 1 hour. 89 mg of the catalyst was fed to the autoclave. After 1 hour of polymerization, the yield of polyethylene was 140 g, giving a catalyst activity of 1.6 kg PE/(g cat h).

Polymer Properties

Mw/Mn=4.9; Mw=388 000.

Example 8

Catalyst Preparation

As in example 6.

Test Polymerization Second (14 Days Ageing)

Polymerization was carried out in a 2-liter Büchi autoclave in i-butane. The ethylene partial pressure was 5 bar, the temperature was 80° C. and the reaction time was 1 hour. 132 mg of the catalyst was fed to the autoclave. After 1 hour of polymerization, the yield of polyethylene was 219 g, giving a catalyst activity of 1.7 kg PE/(g cat h).

Polymer Properties

Mw/Mn=4.2; Mw=346 000.

Example 9

Catalyst Preparation

As in example 6.

Test Polymerization Third (60 Days Ageing)

Polymerization was carried out in a 2-liter Büchi autoclave in i-butane. The ethylene partial pressure was 5 bar, the temperature was 80° C. and the reaction time was 1 hour. 147 mg of the catalyst was fed to the autoclave. After 1 hour of polymerization, the yield of polyethylene was 176 g, giving a catalyst activity of 1.2 kg PE/(g cat h).

Polymer Properties

Mw/Mn=4.2; Mw=346 000.

Example 10

Catalyst Preparation

Carrier Calcination

Sylopol 55SJ silica was calcinated under nitrogen for 10 hours at 100° C.

Impregnation of Metallocene 80 mg rac-ethylene-bis(2-tert-butyldimethylsiloxyindenyl)zirconium dimethyl was dissolved into 1.5 ml of 90% hexaisobutylalumoxane and 4 ml of extra toluene was added. This solution was added to 5.1868 g of the previously prepared silica carrier in a septum bottle. The catalyst was dried in a fume cupboard under a nitrogen flow at 30° C. for one hour. The catalyst has Zr content of 1.0 w-% and Al/Zr=120.

Test Polymerization

Polymerization was carried out in a 2-liter Büchi autoclave in i-butane. The ethylene partial pressure was 5 bar, the temperature was 80° C. and the reaction time was 1 hour. 109 mg of the catalyst was fed to the autoclave. After 1 hour of polymerization, the yield of polyethylene was 102 g, giving a catalyst activity of 0.94 kg PE/(g cat h).

Polymer Properties

Mw/Mn=3.3; Mw=192 000.

Example 11

Catalyst Preparation

Carrier Calcination

MS3040 silica was calcinated under nitrogen for 10 hours at 500° C.

Impregnation of Metallocene 3 ml 70% hexaisobutylalumoxane and toluene was added. 1.5 ml of this solution was added to 1.0457 g of the previously prepared silica carries in a septum bottle. 80.6 mg of rac-ethylene-bis(2-tert-butyldimethylsiloxyindenyl) zirconium dimethyl was dissolved into was added 1.5 ml of this solution was added silica carries in a septum bottle The catalyst was dried in a fume cupboard under a nitrogen flow at 30° C. for one hour. The ready catalyst has Zr content of 1.0 w-% and Al/Zr=240.

Test Polymerization

Polymerization was carried out in a 2-liter Büchi autoclave in i-butane. The ethylene partial pressure was 5 bar, the temperature was 80° C. and the reaction time was 1 hour. 126 mg of the catalyst was fed to the autoclave. After 1 hour of polymerization, the yield of polyethylene was 72 g, giving a catalyst activity of 0.6 kg PE/(g cat h).

Polymer Properties

Mw/Mn=4.3; Mw=209 000.

Example 12

Carrier Calcination

Sylopol 55SJ silica was calcinated under nitrogen for 10 hours at 100° C.

Impregnation of Metallocene 405.4 mg of rac-ethylene-bis(2-tert-butyldimethylsiloxyindenyl)zirconium dimethyl was dissolved into 15 ml 70% hexaisobutylalumoxane and toluene was added. 15 ml of this solution was added to 10.0463 g of the previously prepared silica carries in a septum bottle. The ready catalyst has Zr content of 0.6 w-%, Al 9.3 w-% and Al/Zr=120.

Test Polymerization

Polymerization was carried out in a 3-liter Büchi autoclave in i-butane. The ethylene partial pressure was 5 bar, the temperature was 80° C. and the reaction time was 1 hour. 142 mg of the catalyst was fed to the autoclave. After 1 hour of polymerization, the yield of polyethylene was 235 g, giving a catalyst activity of 1.9 kg PE/(g cat h).

Example 13

Carrier Calcination

Sylopol 55SJ silica was calcinated under nitrogen for 10 hours at 100° C.

Impregnation of Metallocene 405.4 mg of rac-ethylene-bis(2-tert-butyldimethylsiloxyindenyl)zirconium dimethyl was dissolved into 15 ml 70% hexaisobutylalumoxane and toluene was added. 15 ml of this solution was added to 10.0463 g of the previously prepared silica carries in a septum bottle. Catalyst was dried at 70° C. The ready catalyst has Zr content of 0.6 w-%, Al 9.3 w-% and Al/Zr=120.

Test Polymerization

Polymerization was carried out in a 3-liter Büchi autoclave in i-butane. The ethylene partial pressure was 5 bar, the temperature was 80° C. and the reaction time was 1 hour. 124 mg of the catalyst was fed to the autoclave. After 1 hour of polymerization, the yield of polyethylene was 144 g, giving a catalyst activity of 1.2 kg PE/(g cat h).

Example 14

Carrier Calcination

Sylopol 55SJ silica was calcinated under nitrogen for 10 hours at 100° C.

Impregnation of Metallocene 70.1 mg of rac-ethylene-bis(2-tert-butyldimethylsiloxyindenyl)zirconium dimethyl was dissolved into 1.5 ml 70 w-% hexaisobutylalumoxane. 1.5 ml of this solution was added to 1.0 g of the previously prepared silica carries in a septum bottle. The ready catalyst has 1.0 w-% Zr, 10.3 w-% Al and Al/Zr=60.
Test Polymerization
Polymerization was carried out in a 3-liter Büchi autoclave in i-butane. The ethylene partial pressure was 5 bar, the temperature was 80° C. and the reaction time was 1 hour. 113 mg of the catalyst was fed to the autoclave. After 1 hour of polymerization, the yield of polyethylene was 143 g, giving a catalyst activity of 1.4 kg PE/(g cat h).

Example 15
Carrier Calcination
Sylopol 55SJ silica was calcinated under nitrogen for 10 hours at 100° C.
Impregnation of Metallocene
40 mg of rac-ethylene-bis(2-tert-butyldimethylsiloxyindenyl)zirconium dimethyl was dissolved into 1.6 ml 70 w-% hexaisobutylalumoxane. 1.5 ml of this solution was added to 1.0 g of the previously prepared silica carries in a septum bottle. The ready catalyst has 0.6 w-% Zr, 12,0 w-% Al and Al/Zr=150.
Test Polymerization
Polymerization was carried out in a 3-liter Büchi autoclave in i-butane. The ethylene partial pressure was 5 bar, the temperature was 80° C. and the reaction time was 1 hour. 114 mg of the catalyst was fed to the autoclave. After 1 hour of polymerization, the yield of polyethylene was 95 g, giving a catalyst activity of 0.83 kg PE/(g cat h).

Example 16
Carrier Calcination
Sylopol 55SJ silica was calcinated under nitrogen for 10 hours at 300° C.
Impregnation of Metallocene
40 mg of rac-ethylene-bis(2-tert-butyldimethylsiloxyindenyl)zirconium dimethyl was dissolved into 1.6 ml 70 w-% hexaisobutylalumoxane. 1.5 ml of this solution was added to 1.0 g of the previously prepared silica carries in a septum bottle. The ready catalyst has 0.6 w-% Zr, 12.0 w-% Al and Al/Zr=150.
Test Polymerization
Polymerization was carried out in a 3-liter Büchi autoclave in i-butane. The ethylene partial pressure was 5 bar, the temperature was 80° C. and the reaction time was 1 hour. 167 mg of the catalyst was fed to the autoclave. After 1 hour of polymerization, the yield of polyethylene was 130 g, giving a catalyst activity of 0.78 kg PE/(g cat h).

Example 17
Carrier Calcination
Sylopol 55SJ silica was calcinated under nitrogen for 10 hours at 600° C.
Impregnation of Metallocene
40 mg of rac-ethylene-bis(2-tert-butyldimethylsiloxyindenyl)zirconium dimethyl was dissolved into 1.6 ml 70 w-% hexaisobutylalumoxane. 1.5 ml of this solution was added to 1.0 g of the previously prepared silica carries in a septum bottle. The ready catalyst has 0.6 w-% Zr, 12.0 w-% Al and Al/Zr=150.
Test Polymerization
Polymerization was carried out in a 3-liter Büchi autoclave in i-butane. The ethylene partial pressure was 5 bar, the temperature was 80° C. and the reaction time was 1 hour. 174 mg of the catalyst was fed to the autoclave. After 1 hour of polymerization, the yield of polyethylene was 114 g, giving a catalyst activity of 0.65 kg PE/(g cat h).

Example 18
Carrier Calcination
Sylopol 55SJ silica was calcinated under nitrogen for 10 hours at 800° C.
Impregnation of Metallocene
40 mg of rac-ethylene-bis(2-tert-butyldimethylsiloxyindenyl)zirconium dimethyl was dissolved into 1.6 ml 70 w-% hexaisobutylalumoxane. 1.5 ml of this solution was added to 1.0 g of the previously prepared silica carries in a septum bottle. The ready catalyst has 0.6 w-% Zr, 12.0 w-% Al and Al/Zr=150.
Test Polymerization
Polymerization was carried out in a 3-liter Büchi autoclave in i-butane. The ethylene partial pressure was 5 bar, the temperature was 80° C. and the reaction time was 1 hour. 161 mg of the catalyst was fed to the autoclave. After 1 hour of polymerization, the yield of polyethylene was 32 g, giving a catalyst activity of 0.2 kg PE/(g cat h).

Example 19
Carrier Calcination
Sylopol 55SJ silica was calcinated under nitrogen for 10 hours at 100° C.
Impregnation of Metallocene
20 mg of rac-ethylene-bis(2-tert-butyldimethylsiloxyindenyl)zirconium dimethyl was dissolved into 1.5 ml 70 w-% hexaisobutylalumoxane. 1.2 ml of this solution was added to 0.85 g of the previously prepared silica carries in a septum bottle. The ready catalyst has 0.3 w-% Zr, 11.0 w-% Al and Al/Zr=240.
Test Polymerization
Polymerization was carried out in a 3-liter Büchi autoclave in i-butane. The ethylene partial pressure was 5 bar, the temperature was 80° C. and the reaction time was 1 hour. 165 mg of the catalyst was fed to the autoclave. After 1 hour of polymerization, the yield of polyethylene was 145 g, giving a catalyst activity of 0.88 kg PE/(g cat h).

Example 20
Carrier Calcination
Sylopol 55SJ silica was calcinated under nitrogen for 10 hours at 100° C.
Impregnation of Metallocene
48 mg of rac-ethylene-bis(2-tert-butyldimethylsiloxyindenyl)zirconium dimethyl was dissolved into 1.16 ml 70 w-% hexaisobutylalumoxane. 1.5 ml of this solution was added to 1.0 g of the previously prepared silica carries in a septum bottle. The ready catalyst has 0.6 w-% Zr, 8.9 w-% Al and Al/Zr=80.
Test Polymerization
Polymerization was carried out in a 3-liter Büchi autoclave in i-butane. The ethylene partial pressure was 5 bar, the temperature was 80° C. and the reaction time was 1 hour. 134 mg of the catalyst was fed to the autoclave. After 1 hour of polymerization, the yield of polyethylene was 93 g, giving a catalyst activity of 0.7 kg PE/(g cat h).

TABLE 1

Polymerization was carried out in a 2- or 3-liter Büchi autoclave in i-butane slurry. The ethylene partial pressure was 5 bar, temperature 80° C., polymerization time 60 minutes. Aberrations are mentioned on comments.

| Ex. | Carrier | Calcination | Zr-content | Al/Zr-ratio | Catalyst (mg) | Yield (g) | Activity kgPE/g × cat × h | Mw | D | Comments |
|---|---|---|---|---|---|---|---|---|---|---|
| 1 | Sylopol 55SJ | 100 | 0.6 | 120 | 131 | 124 | 0.95 | — | — | TMA treated carrier, Compound 1 |
| 2 | Sylopol 55SJ | No | 0.6 | 120 | 180 | 14.9 | 0.08 | 212000 | 4.4 | Compound 2 |
| 3 | | 100 | 0.6 | 120 | 130 | 121 | 0.96 | 283000 | 3.7 | |
| 4 | | 100 | 0.6 | 120 | 130 | 196 | 1.5 | 372000 | 4.7 | |
| 5 | | 300 | 0.6 | 120 | 136 | 212 | 0.9 | — | — | |
| 6 | | 600 | 0.6 | 120 | 140 | 210 | 1.3 | 388000 | 4.9 | |
| 7 | | 100 | 1.2 | 60 | 89 | 140 | 1.6 | 388000 | 4.9 | 1 day |
| 8 | | | | | 132 | 219 | 1.7 | 346000 | 4.2 | 14 day |
| 9 | | | | | 147 | 176 | 1.2 | 346000 | 4.2 | 60 day |
| 10 | | | | | 109 | 102 | 0.94 | 192000 | 3.3 | HIBAO heated |
| 11 | MS3040 | 500 | 1.2 | 240 | 126 | 72 | 0.6 | 209000 | 4.3 | Large P.V. silica |
| 12 | Sylopol 55SJ | 100 | 0.6 | 120 | 142 | 235 | 1.9 | — | — | |
| 13 | | | | | 124 | 144 | 1.2 | — | — | Pol. temp. 70° C. |
| 14 | | | 1.0 | 60 | 113 | 143 | 1.2 | — | — | |
| 15 | | 100 | 0.6 | 150 | 114 | 95 | 0.83 | — | — | |
| 16 | | 300 | 0.6 | 150 | 167 | 130 | 0.78 | | | |
| 17 | | 600 | 0.6 | 150 | 174 | 114 | 0.65 | | | |
| 18 | | 800 | 0.6 | 150 | 161 | 32 | 0.2 | | | |
| 19 | | | 0.3 | 240 | 165 | 145 | 0.88 | — | — | |
| 20 | | | 0.6 | 80 | 134 | 93 | 0.7 | — | — | |

What is claimed is:

1. A process for the preparation of a supported olefin polymerization catalyst composition, comprising a support, a metallocene, and an alumoxane, wherein a support comprising a porous carrier is contacted, in any order, with at least one member of the group consisting of
   (a) an organometallic compound of the general formula (1):

$$R_l M X_{v-1} \quad (1)$$

wherein each R is the same or different and is a $C_1$–$C_{10}$ alkyl group; M is a metal of Group 1, 2, 12 or 13 of the Periodic Table; each X is the same or different and one of a halogen atom, a hydrogen atom, a hydroxyl radical or a $C_1$–$C_8$ hydrocarbyloxy group; l is 1, 2 or 3; v is the oxidation number of the metal M,
and with a complex solution of at least
   (b) a metallocene of the general formula (2):

$$(CpY)_m M'X'_n Z_o$$

wherein each CpY is the same or different and is one of a mono- or polysubstituted, fused or non-fused, homo- or heterocyclic cyclopentadienyl, indenyl, tetrahydroindenyl, fluorenyl, or octahydrofluorenyl ligand, which ligand is substituted at its cyclopentadienyl ring with at least one substituent Y which is one of a —OR', —SR', —NR'$_2$, or —PR'$_2$ radical, each R' being the same or different and is one of a tri-$C_1$–$C_8$ hydrocarbylsilyl group or a tri-$C_1$–$C_8$ hydrocarbyloxy silyl group; M' is a transition metal of Group 4 of the Periodic Table and bound to the ligand CpY at least in an $N_5$ bonding mode; each X' is the same or different and is one of a hydrogen atom, a halogen atom, a $C_1$–$C_8$ hydrocarbyl group, a $C_1$–$C_8$ hydrocarbylheteroatom group or a tri-$C_1$–$C_8$ hydrocarbyl silyl group or two X' form a ring with each other; Z is a bridge atom or group between two CpY ligands, or one CpY ligand and the transition metal M'; m is 1 or 2; o is 0 or 1' and n is 4-m if there is no bridge Z or Z is a bridge between two CpY ligands, or n is 4-m-o if Z is a bridge between one CpY ligand and the transition metal M', and

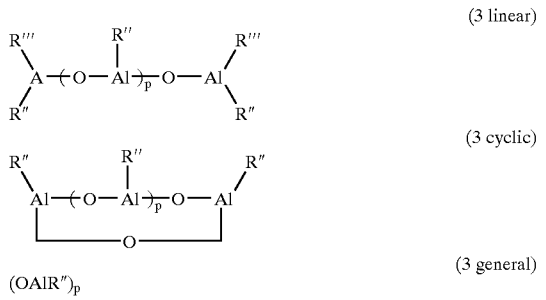

(3 linear)

(3 cyclic)

(3 general)

$(OAlR'')_p$ (c) an alumoxane of one of the following formulas (3):

wherein each R'' and each R''' is the same or different and is a $C_2$–$C_{12}$ alkyl group;
   and p is an integer between 1 and 40;
   and recovering said supported olefin polymerization catalyst composition.

2. The process according to claim 1, wherein said support is first contacted with:
   (a) said organometallic compound of the general formula (1), then with a complex solution of
   (b) said metallocene of the general formula (2), and
   (c) said alumoxane of the general formulas (3).

3. The process according to claim 2, wherein
   (a1) said support is contacted with a solution of said organometallic compound (1), and the supernatant is removed from the contacting product,
   (b1) the product of step (a1) is contacted with said complex solution of said metallocene (2) and of said alumoxane (3), and the supernatant is removed from the contacting product, whereby the volume of at least one of said solutions is less than that at which a slurry is formed.

4. The process according to claim 1, 2 or 3, wherein said support is a porous carrier.

5. The process according to claim 4, wherein said porous carrier is an inorganic oxide.

6. The process according to claim 5, wherein said inorganic oxide is a silicon dioxide.

7. The process according to claim 1, wherein said support is heated to a temperature of between 90 and 1000° C.

8. The process according to claim 7, wherein the silicon dioxide is in the form of, or is deposited on, particles having a diameter of between 10 and 500 µm, and, independently, having a surface area of between 50 and 600 m²/g.

9. The process according to claim 1, wherein said organometallic compound of step (a) is selected from the group consisting of a $C_1$–$C_{10}$ alkyl lithium, a $C_1$–$C_{10}$ dialkyl magnesium, or a $C_1$–$C_{10}$ trialkyl aluminium.

10. The process according to claim 1, wherein said organometallic compound of step (a) is immersed or dissolved in a $C_4$–$C_{10}$ hydrocarbon medium.

11. The process according to claim 1, wherein the weight ratio of said organometallic compound of step (a) to the support is between 0.1 and 10.

12. The process according to claim 1, wherein said tri-$C_1C_8$ hydrocarbyl silyl group R' of said substituent Y is a tri-$C_1C_8$ alkyl silyl group, wherein at least one of the $C_1$–$C_8$ alkyls is a branched $C_3$–$C_8$ alkyl.

13. The process according to claim 1, wherein m of said metallocene of step (b) is 2 and the two Cp ligands are bridged with each other by a bivalent atom or group Z having at least one chain atom which is selected from the group consisting of carbon, silicon, oxygen, sulfur, nitrogen or phosphorous.

14. The process according to claim 1, wherein M' is Zr in said metallocene of step (b).

15. The process according to claim 1, wherein X' is a halogen atom and/or a $C_1$–$C_8$ hydrocarbyl group.

16. The process according to claim 1, wherein said metallocene of step (b) has the following structural formula (4)

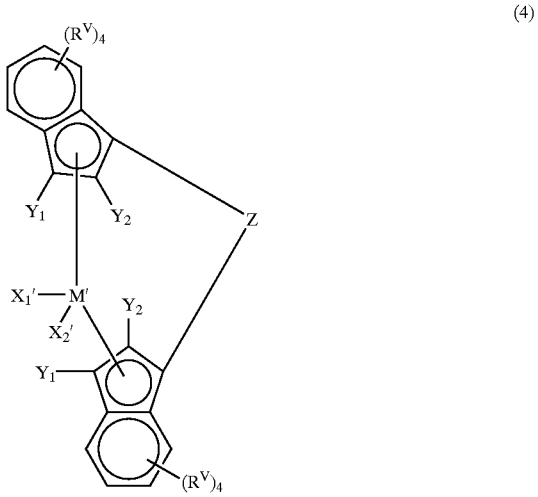

(4)

wherein $Y^1$ and $Y_2$ are the same or different and are one of a hydrogen atom, a halogen atom, an acyl group, an acyloxy group, a $C_1$–$C_{10}$ hydrocarbyl group, a —OR', —SR', —NR' or —PR'$_2$ radical, R' being a tri-$C_1$–$C_{10}$-hydrocarbylsilyl group, provided that at least one of $Y^1$ and $Y_2$ is one of said —OR', —SR', —NR' or —PR'$_2$ radicals; Z is a bivalent atom or group having at least one chain atom which is one of a carbon, silicon, oxygen, sulphur, nitrogen, or phosphorus atom; each $R^v$ is the same or different and is one of a hydrogen atom, a halogen atom, a $C_1$–$C_{10}$ hydrocarbyl group, or a $C_1$–$C_{10}$ hydrocarbyloxy group or ring constituent, M' is one of Ti, Zr, or Hf; and X'$_1$, and X'$_2$ are the same or different and are one of a halogen atom and a $C_1$–$C_8$ hydrocarbyl group.

17. The process according to claim 1, wherein said metallocene of step (b) is ethylene-bis(2-tert-butyldimethylsiloxyindenyl)zirconium dimethyl.

18. The process according to claim 1, wherein said metallocene of step (b) is dissolved in a $C_4$–$C_{10}$ hydrocarbon solvent.

19. The process according to claim 1, wherein the molar to weight ratio of said metallocene compound of step (b) to said support is between 0.001 and 0.50 mmol/g.

20. The process according to claim 1, wherein said R" of said alumoxane of step (c) is a $C_3$–$C_{12}$ alkyl group and, independently, $2 \leq p \leq 12$.

21. The process acording to claim 20, wherein said alumoxane of step (c) is hexa(isobutylaluminiumoxane).

22. The process according to claim 1, wherein said alumoxane of step (c) is dissolved or immersed in a hydrocarbon solvent and contacted with said support previous to or immediately before the beginning of olefin polymerization.

23. The process according to claim 1, wherein the molar ratio between said alumoxane aluminium of step (c) and said transition metal M' of said metallocene of step (b) is between 20 and 500.

24. A supported olefin polymerization catalyst composition, comprising the product formed according to claim 1.

25. A process for polymerizing at least one olefin, wherein said olefin is polymerized using a supported olefin polymerization catalyst composition according to claim 24.

26. The process according to claim 8, wherein said silicon dioxide is calcined silica.

27. The process according to claim 8, wherein said particle diameter is between 20 and 200 µm and said surface area is between 100 and 500 m²/g.

28. The process according to claim 9, wherein said $C_1$–$C_{10}$ trialkyl aluminium is trimethyl aluminium.

29. The process according to claim 11, wherein said weight ratio is between 0.3 and 1.5.

30. The process according to claim 12, wherein said branched C3–C8 alkyl is selected from the group consisting of isopropyl, isobutyl, sec-butyl, tert-butyl, isoamyl, sec-amyl, and tert-amyl.

31. The process according to claim 13, wherein said Z is ethylene or silylene.

32. The process according to claim 15, wherein said X' is a chlorine and/or methyl.

33. The process according to claim 16, wherein said Z is a bivalent group having at least one chain atom of 1–4 carbon and/or silicon.

34. The process according to claim 18, wherein said hydrocarbon solvent is toluene.

35. The process according to claim 19, wherein said weight ratio is 0.02 to 0.08 mmol/g.

36. The process according to claim 20, wherein said R" is selected from the group consisting of an isopropyl, isobutyl, sec-butyl, tert-butyl, isoamyl, sec-amyl or tert-amyl group and p is $4 \leq p \leq 8$.

37. The process according to claim 22, wherein said hydrocarbon solvent is a $C_4$–$C_{12}$ aliphatic hydrocarbon.

38. The process according to claim 23, wherein said molar ratio is between 40 and 200.

* * * * *